US012688116B2

(12) United States Patent
Isozaki et al.

(10) Patent No.:  US 12,688,116 B2
(45) Date of Patent:      Jul. 21, 2026

(54) ELECTRONIC CONTROL DEVICE AND WRITE CONTROL METHOD

(71) Applicant: Hitachi Astemo, Ltd., Hitachinaka (JP)

(72) Inventors: Yasunori Isozaki, Hitachinaka (JP);
Yusuke Abe, Hitachinaka (JP);
Takahiro Iida, Hitachinaka (JP)

(73) Assignee: Hitachi Astemo, Ltd., Hitachinaka (JP)

( * ) Notice: Subject to any disclaimer, the term of this
patent is extended or adjusted under 35
U.S.C. 154(b) by 0 days.

(21) Appl. No.: 18/846,246

(22) PCT Filed: Apr. 22, 2022

(86) PCT No.: PCT/JP2022/018588
§ 371 (c)(1),
(2) Date: Sep. 11, 2024

(87) PCT Pub. No.: WO2023/203768
PCT Pub. Date: Oct. 26, 2023

(65) Prior Publication Data
US 2025/0190337 A1      Jun. 12, 2025

(51) Int. Cl.
*G06F 12/00* (2006.01)
*G06F 12/02* (2006.01)
(52) U.S. Cl.
CPC ................................ *G06F 12/0223* (2013.01)
(58) Field of Classification Search
CPC .... G06F 12/0223; G06F 8/65; G06F 11/1446;
G06F 2212/1032; G06F 12/0868; G06F
2212/214; G06F 2212/225; G06F
12/0238; G06F 2212/173; G06F
2212/283; G11C 16/102; G07C 5/008
See application file for complete search history.

(56) References Cited

U.S. PATENT DOCUMENTS 6,892,269 B2 *  5/2005  Polizzi .................. G11C 16/08
                                                        711/103
8,364,884 B2 *  1/2013  Nagadomi .......... G06F 12/0246
                                                        711/103
(Continued)

FOREIGN PATENT DOCUMENTS

JP        2016-037157 A      3/2016
JP           6427260 B2 *  11/2018    ......... G05B 19/0423
(Continued)

OTHER PUBLICATIONS

International Search Report Issued in PCT Application No. PCT/
JP2022/018588 dated Jul. 12, 2022, with English Translation.

*Primary Examiner* — Shawn X Gu
*Assistant Examiner* — Mohammad S Hasan
(74) *Attorney, Agent, or Firm* — Foley & Lardner LLP

(57) ABSTRACT

An electronic control device includes: a microcomputer
including a processor that executes a predetermined pro-
gram; and an external nonvolatile memory connected to the
microcomputer, in which the microcomputer includes an
internal nonvolatile memory, a first communication unit that
communicates with the external nonvolatile memory, and a
second communication unit that communicates with an
external device, and the microcomputer writes data, which is
received from the external device and rewrites the internal
nonvolatile memory, in the internal nonvolatile memory and
the external nonvolatile memory.

5 Claims, 11 Drawing Sheets

(56)                    References Cited

U.S. PATENT DOCUMENTS

| | | | | |
|---|---|---|---|---|
| 12,141,569 | B2 * | 11/2024 | Mizuhashi | .............. G06F 11/14 |
| 2007/0106430 | A1 * | 5/2007 | Goto | ........................ G06F 8/654 |
| | | | | 701/1 |
| 2013/0057354 | A1 * | 3/2013 | Yanagisawa | ......... G01C 19/574 |
| | | | | 331/156 |
| 2018/0032432 | A1 * | 2/2018 | Kowles | ................. G06F 3/0647 |
| 2024/0126528 | A1 | 4/2024 | Mizuhashi et al. | |

FOREIGN PATENT DOCUMENTS

| | | | | |
|---|---|---|---|---|
| JP | 2021-024555 | A | 2/2021 | |
| JP | 7506766 | B2 * | 6/2024 | .............. G06F 8/65 |
| WO | WO-2021/075361 | A1 | 4/2021 | |

* cited by examiner

Figures 1, 2A:
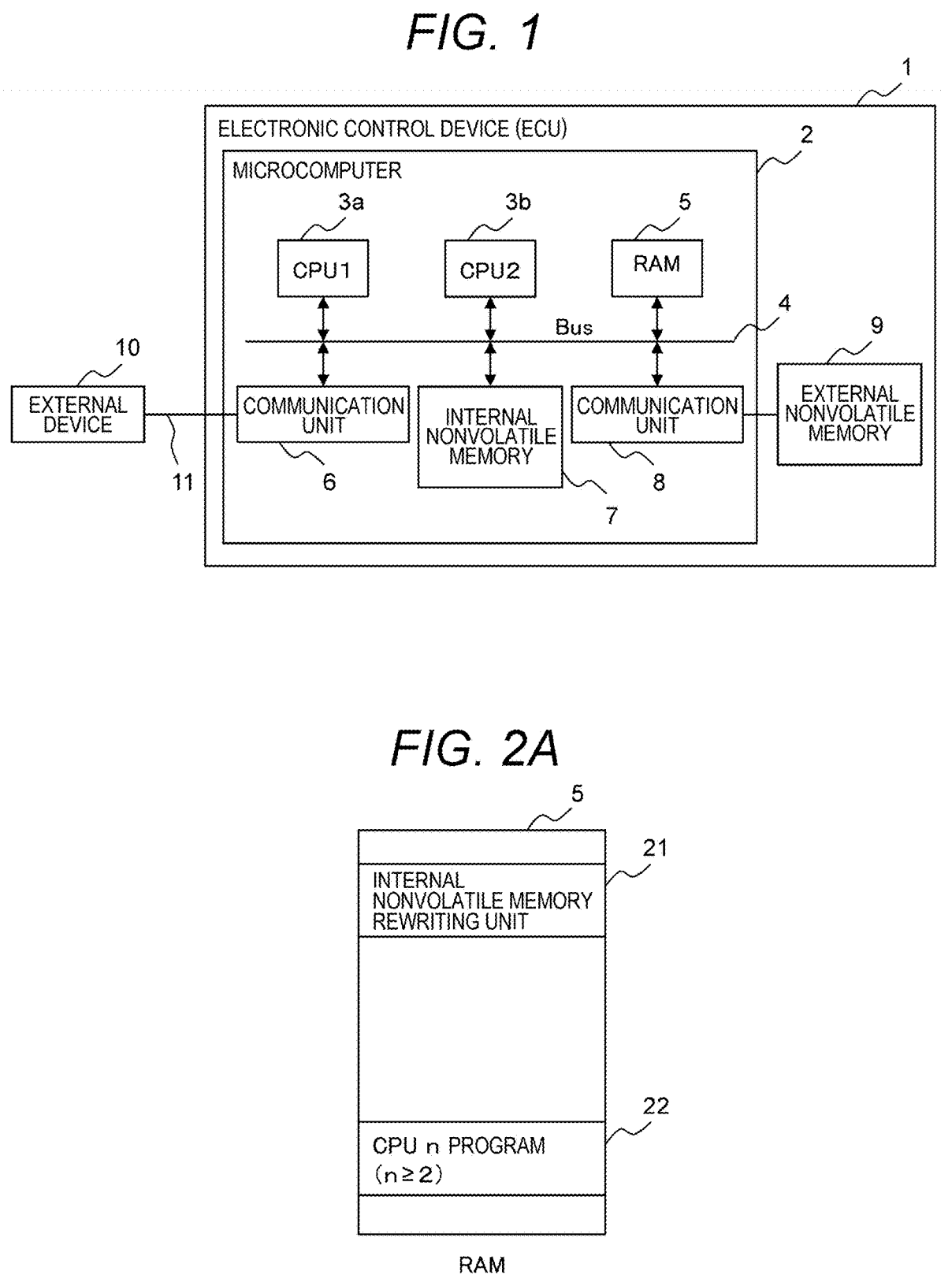

ELECTRONIC CONTROL DEVICE (ECU)

MICROCOMPUTER          2

3a          3b          5

| CPU1 | CPU2 | RAM |

Bus          4          9

10

EXTERNAL
DEVICE

| COMMUNICATION UNIT | INTERNAL NONVOLATILE MEMORY | COMMUNICATION UNIT |

EXTERNAL NONVOLATILE MEMORY 11          6          7          8

INTERNAL
NONVOLATILE MEMORY
REWRITING UNIT

22

CPU n PROGRAM
(n≥2)

RAM

| | |
|---|---|
| COMMUNICATION AND DATA PROCESSING UNIT | 23 |
| EXTERNAL NONVOLATILE MEMORY CONTROL UNIT | 24 |
| OTHER PIECES OF DATA | 25 |
| REWRITE TARGET AREA (CONTROL SOFTWARE STORAGE AREA) | 26 |

7

INTERNAL NONVOLATILE MEMORY

SET OF
CONTROL PROGRAM
UPDATE FILES

CONTROL
SOFTWARE BODY

REWRITE CONTROL
INFORMATION

RAM

INTERNAL NONVOLATILE MEMORY

PROCESSING
DIRECTION
(POINTER
CHANGE
DIRECTION)

41
RECEPTION
COMPLETION
POINTER
42
WRITE
COMPLETION
POINTER

32

RECEPTION
PROCESSING
COMPLETION AREA
(PROCESSOR 3a)

UNPROCESSED

WRITE PROCESSING
COMPLETION AREA
(PROCESSOR 3b)

RECEIVED DATA
STORAGE UNIT

FIG. 8

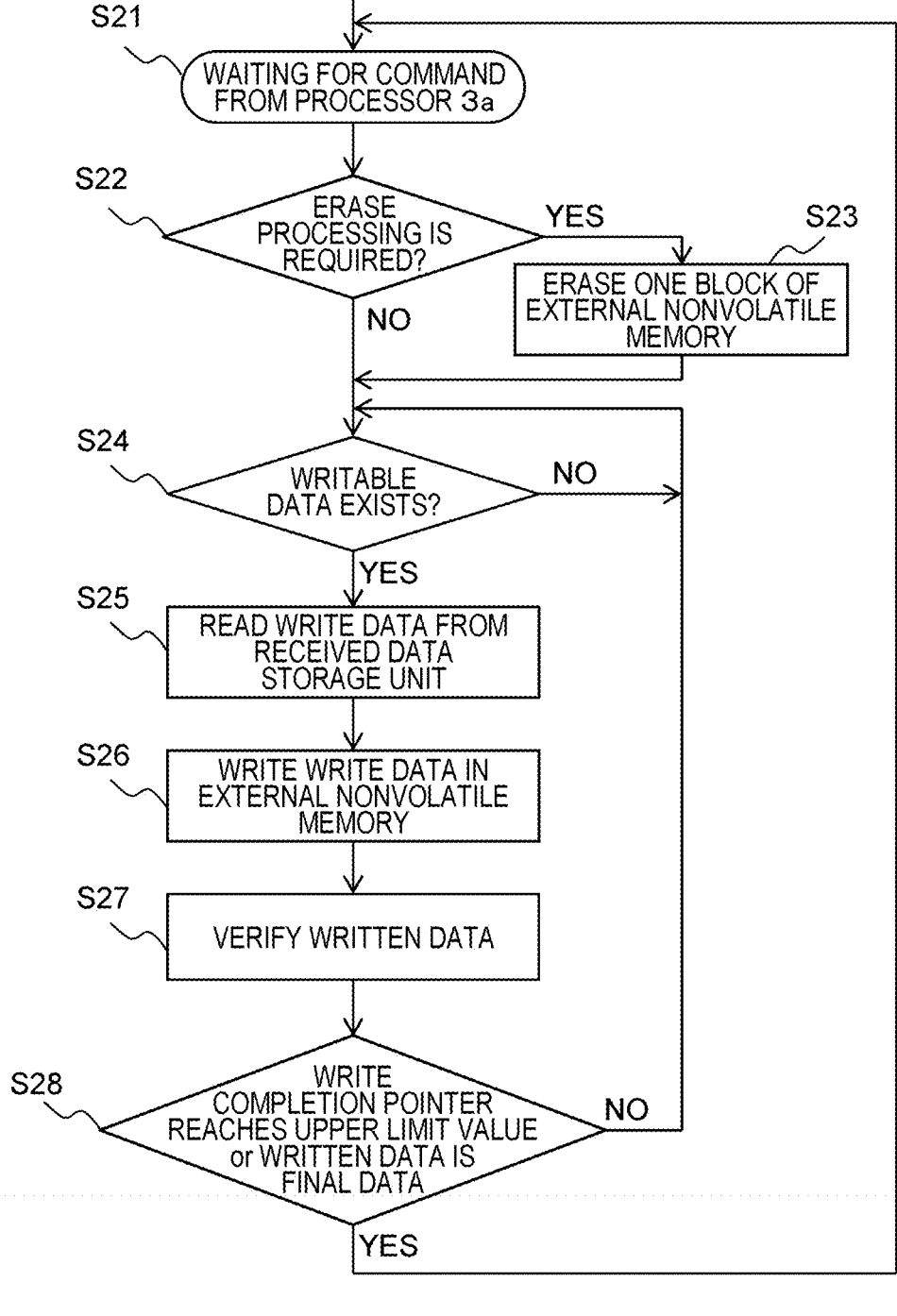

S21 — WAITING FOR COMMAND FROM PROCESSOR 3a

S22 — ERASE PROCESSING IS REQUIRED? — YES — S23 — ERASE ONE BLOCK OF EXTERNAL NONVOLATILE MEMORY

NO

S24 — WRITABLE DATA EXISTS? — NO

YES

S25 — READ WRITE DATA FROM RECEIVED DATA STORAGE UNIT

S26 — WRITE WRITE DATA IN EXTERNAL NONVOLATILE MEMORY

S27 — VERIFY WRITTEN DATA

S28 — WRITE COMPLETION POINTER REACHES UPPER LIMIT VALUE or WRITTEN DATA IS FINAL DATA — NO

YES

FIG. 10

TRANSMISSION AND RECEPTION PROCESSING WITH
EXTERNAL DEVICE
RECEPTION PROCESSING ACCORDING TO PREDETERMINED
PROTOCOL (SUCH AS UDS)
STORAGE PROCESSING IN RECEIVED DATA STORAGE UNIT
DECODING PROCESSING OF WRITE DATA
DECOMPRESSION PROCESSING OF WRITE DATA

COMMUNICATION AND
DATA PROCESSING
TASK

ERASE OF INTERNAL NONVOLATILE MEMORY
WRITE OF INTERNAL NONVOLATILE MEMORY
CHECKING OF END OF ERASE AND WRITE PROCESSING

INTERNAL
NONVOLATILE MEMORY
REWRITE TASK

ERASE OF EXTERNAL NONVOLATILE MEMORY
WRITE OF EXTERNAL NONVOLATILE MEMORY
READ OF EXTERNAL NONVOLATILE MEMORY
CHECKING OF END OF ERASE AND WRITE PROCESSING

EXTERNAL
NONVOLATILE MEMORY
REWRITE TASK

FIG. 11A

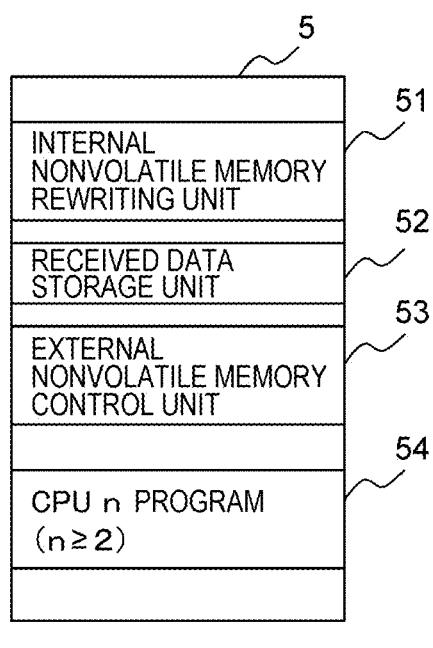

5

51

INTERNAL
NONVOLATILE MEMORY
REWRITING UNIT

52

RECEIVED DATA
STORAGE UNIT

53

EXTERNAL
NONVOLATILE MEMORY
CONTROL UNIT

54

CPU n PROGRAM
(n ≥ 2)

RAM

55
COMMUNICATION AND DATA PROCESSING TASK

56
OTHER PIECES OF DATA

57
REWRITE TARGET AREA (CONTROL SOFTWARE STORAGE AREA)

INTERNAL NONVOLATILE MEMORY

FIG. 12

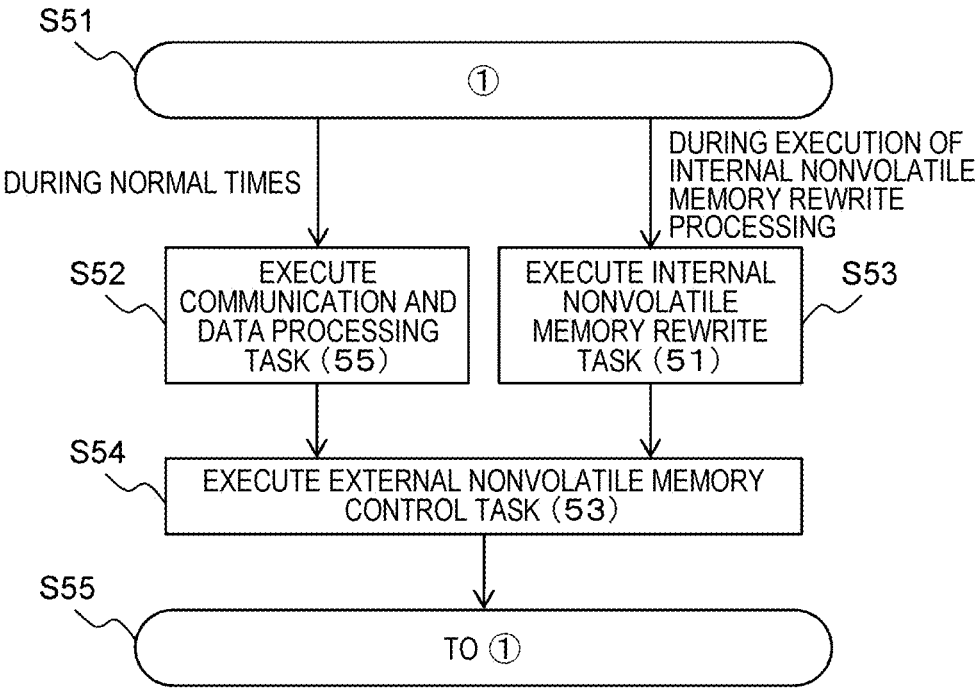

S51
①

DURING NORMAL TIMES

DURING EXECUTION OF INTERNAL NONVOLATILE MEMORY REWRITE PROCESSING

S52
EXECUTE COMMUNICATION AND DATA PROCESSING TASK (55)

S53
EXECUTE INTERNAL NONVOLATILE MEMORY REWRITE TASK (51)

S54
EXECUTE EXTERNAL NONVOLATILE MEMORY CONTROL TASK (53)

S55
TO ①

ELECTRONIC CONTROL DEVICE AND WRITE CONTROL METHOD

TECHNICAL FIELD

The present invention relates to an in-vehicle electronic control device.

BACKGROUND ART

An electronic control device such as an electrical control unit (ECU) is controlled by a microcomputer. The microcomputer mounted on the electronic control device implements various functions, and an external circuit corresponding to these functions is provided, and the device connected as the external circuit is controlled by control software stored in a nonvolatile memory (hereinafter, the internal nonvolatile memory) inside the microcomputer.

The ECU has a function of rewriting the control software stored in the internal nonvolatile memory in accordance with a signal from the outside. Conventionally, for example, a diagnostic tool is connected to an ECU in a wired manner through an on-board diagnostic (OBD) connector, and the control software to be updated is transferred according to a predetermined protocol such as unified diagnostic services (UDS) or a universal measurement and calibration protocol (XCP) by communication means such as a controller area network (CAN), thereby rewriting the internal nonvolatile memory. However, in recent years, there is also a system of transferring the control software by over-the-air (OTA) wireless communication.

For example, the rewrite of the control software by the OTA is performed in the following procedure. Update data wirelessly transferred from a data server during use of a vehicle is received by an in-vehicle receiver, and the transferred update data is sent to an update target ECU through a gateway and a transmission path of an in-vehicle network. After the reception of the update data is completed, notification indicating that the control software can be updated is issued to the user on an in-vehicle monitor or the like, and operation from the user is waited. Thereafter, the control software is updated with the received update data according to an update request of the control software by the operation from the user.

When a control software rewriting method by the OTA does not exist, during requirement for the update of the control software of the ECU, the control software in a repair shop is required to be stored, which takes time and effort for the user. However, in the OTA, the control software can be updated during normal use of the vehicle, and the storage of the vehicle in the repair shop is not required. In addition, a vehicle manufacturer can reduce labor and cost for coping with rewriting of control software, and easily update the ECU to an optimum state. As described above, the OTA is advantageous for both the vehicle manufacturer and the user. For this reason, it is expected that a number of cases where the control software of the ECU is updated by the OTA method increases.

However, a rewriting method for transferring the control software in the wired manner is required in a case of end of line programming (EOLP) in which the control software is written in the ECU in a manufacturing process in a factory and the rewrite of the control software in the repair shop because the control software of the ECU can be rewritten at high speed. That is, in the future, it is expected that a method capable of coping with both the conventional wired method and the OTA method will increase as a method for rewriting the control software of the ECU. In this case, for example, even when the control software is rewritten by the wired method, design that each method can be matched and any method can be selected is required such that the control software does not deviate from the specification related to the OTA (and vice versa).

In order to cope with the rewrite by both methods, sometimes a configuration called a double bank method is mainly adopted as hardware of the ECU. In the double bank method, an internal nonvolatile memory in a microcomputer is divided into two, a currently-executed control program is stored in one area, and the transferred update data is written in the other area. The former is referred to as a front surface, and the latter is referred to as a back surface.

For example, the rewrite of the control software by the OTA using the double bank method is performed in the following procedure. The update data wirelessly transferred from the data server during use of the vehicle is written in the back surface of the nonvolatile memory. The transferred update data may be compressed, encrypted, or the like in order to speed up communication processing or ensure security. In that case, the writing is performed on the back surface of the nonvolatile memory after decompression or decoding is performed.

After the reception of all the update data is completed and the writing in the back surface is completed, the control software is updated according to a request from the user. Specifically, a setting value of an internal register is changed, and the surface on which the control software is activated is set to the opposite side (back surface) to the current one at a start of the next ECU. Although the vehicle cannot be activated during the update processing, the activation surface can be switched by the double bank method, so that the time during which the vehicle cannot be activated can be shortened. For this reason, the double bank method is easy to use and widely adopted.

However, in the case of the double bank method, the internal nonvolatile memory having a capacity twice a data size of the control software is required. In the future, it is expected that the capacity of software will increase from the viewpoint of sophistication of processing such as automatic driving, centralized control of vehicles, or the like. Accordingly, as the required capacity of the software increases, there is a possibility that a microcomputer product having twice the capacity of the internal nonvolatile memory does not exist in the market. Even when such the microcomputer product exists, the cost increases because a price of the microcomputer depends on the capacity of the internal nonvolatile memory. In particular, the manufacturing cost of an in-vehicle product greatly increases from the viewpoint of mass-produced goods. Under the circumstances, because the required capacity is relatively small, twice the required capacity is not a large value, and this disadvantage is small, but it is expected that this disadvantage will become a large disadvantage in the future.

An external bank system in which a flash memory (hereinafter, an external nonvolatile memory) is provided outside the microcomputer without dividing the internal nonvolatile memory of the microcomputer may be adopted as a hardware configuration of the ECU corresponding to this disadvantage. The microcomputer and the external nonvolatile memory are connected to a communication unit inside the microcomputer, and can erase or write the external nonvolatile memory according to a communication content from the microcomputer.

For example, the control software is rewritten by the OTA using the external bank method in the following procedure.

The update data wirelessly transferred from the data server during the use of the vehicle is written in the external nonvolatile memory. The transferred update data may be compressed, encrypted, or the like in order to speed up communication processing or ensure security. In that case, it is preferable that the data is directly written in the external nonvolatile memory surface without performing the decompression or the decoding.

After the reception of all the update data is completed and the write in the external nonvolatile memory is completed, the control software is updated by a request from the user similarly to the double bank method. Specifically, the data stored in the external nonvolatile memory is read, required processing such as the decoding and the decompression is performed, the internal nonvolatile memory is rewritten, and the control software is updated.

In the external bank method, the required capacity of the internal nonvolatile memory is prevented to be equal to the required capacity of the control software. Although it is necessary to separately provide the external nonvolatile memory, because a general-purpose chip can be used in the mass-produced good, the cost of the ECU can be prevented as compared with the double bank method. For this reason, it is considered as an effective method for coping with the OTA even when the increase in the size of software in the future is expected.

However, the external bank method also has a problem to be solved. As described above, the control software is required to be rewritten in any case so that both the OTA and the wired method can be performed. In the case of the external bank method, there is a problem from this viewpoint.

The update by the OTA has a function called rollback. The rollback means that, when the rewrite of the control software fails, the control software is returned before the update using the data of the control software before the previously-stored update. When the update of the control software by the OTA fails, there is a possibility that the vehicle cannot travel, and thus, the rollback function is an essential function for the ECU that adopts the OTA.

A background art of the present technical field includes the following prior art. In PTL 1 (JP 2016-37157 A), when a core 21 of a multi-core arithmetic processing unit (MCU) receives a rewrite request of the control program (ROM) of a core 22 from the external device, the core 22 executes the rewrite processing. The core 22 executes the reception processing of receiving rewrite data and storing the rewrite data in the cache memory (CAM) and the processing of writing the data stored in the CAM in the ROM. There is described a vehicle control device that suspends the operations of the cores 21 and 23 when the core 22 executes the processing of writing the rewrite data in the ROM.

CITATION LIST

Patent Literature

PTL 1: JP 2016-37157 A

SUMMARY OF INVENTION

Technical Problem

In the case of the double bank method, the data of the control software before the update is the software itself running on the surface. In the case of the external bank method, the data of the control software before the update is stored in the external nonvolatile memory. Accordingly, when the control software is updated only by the OTA, a problem related to this is not particularly generated.

However, in the conventional wired method, because only the internal nonvolatile memory is rewritten, the control software before the update is not stored in the external nonvolatile memory. That is, when the update by the OTA is performed after the control software is updated by the wired method and when the update fails, the program before the update is not stored in the external nonvolatile memory, so that the rollback cannot be performed and the vehicle cannot be activated.

After the wired update, the case of the OTA update applies to all post-factory ECUs adopting the external bank method. That is, in the case where the external bank method is adopted, a countermeasure that enables the rollback during the update by the OTA is required.

A method in which after the update data is stored in the external nonvolatile memory by the OTA, the content of the current internal nonvolatile memory is backed up (copied) in the external nonvolatile memory before the update of the internal nonvolatile memory is considered as one idea to avoid this problem.

However, this method has the following problem from the viewpoint that it is desirable to reduce a processing load of the OTA as much as possible when considering that the OTA mainly performs the processing during the use of the vehicle.

From the viewpoint of the security, it is practically essential to encrypt the data of the control software stored in the external nonvolatile memory. Because the data stored in the internal nonvolatile memory is data (raw data) of plain software, the encryption processing is required in a process of the backup from the internal nonvolatile memory to the external nonvolatile memory, and the processing load due to the encryption increases.

In addition, the update data is preferably compressed in order to shorten the transfer time of the update data by the OTA. In this case, the data stored in the external nonvolatile memory requires the processing of compressing the data stored in the internal nonvolatile memory. In general, the compression processing greatly consumes resources of a CPU and a memory, and thus has a large influence on the processing load. When the copying is performed only by the encryption without the compression, the large capacity of the external nonvolatile memory is required, so that the cost of hardware increases.

From the above viewpoint, the backup by this method is affected by the increase in the processing load or the hardware cost.

In the case of the wired method, a method of writing backup data not only in the internal nonvolatile memory but also in the external nonvolatile memory is conceivable as another method for solving this problem. In this way, the data stored in the internal nonvolatile memory is already backed up in the external nonvolatile memory before the internal nonvolatile memory is updated by the OTA, so that the copy processing described above is not required. Accordingly, the problem in the above method can be solved.

However, in this method, the overall processing time increases due to the addition of the processing to the external nonvolatile memory. When simply calculated, a sum of the write processing times to the respective nonvolatile memories is required. In general, because the processing time required for rewriting the same amount of data is longer in the external nonvolatile memory than in the internal nonvolatile memory, the increase in time is large.

The increase in the processing time is particularly problematic in the case where an initial program is written (EOLP) during shipment in a factory. The vehicles are the mass-produced goods, so that manufacturing processes are strictly controlled. In particular, productivity decreases due to the increase in the processing time. For this reason, a countermeasure cost is required when the production facility is reinforced. That is, the speeding up by the processing on the software is realistic. The increase in the processing time is a very important issue that affects convenience of the future external bank method.

In the technique described in PTL 1, the rewrite processing can be executed at high speed while the power consumption related to the rewrite processing is prevented, but a rewrite target is only the (internal) nonvolatile memory corresponding to the core. A program as a backup cannot be simultaneously written in another memory under the control of the external device.

An object of the present invention is to execute the rewriting of the internal nonvolatile memory and the backup to the external nonvolatile memory at high speed.

Solution to Problem

A representative example of the invention disclosed in the present application is as follows. That is, an electronic control device including: a microcomputer including a processor that executes a predetermined program; and an external nonvolatile memory connected to the microcomputer, in which the microcomputer includes an internal nonvolatile memory, a first communication unit that communicates with the external nonvolatile memory, and a second communication unit that communicates with an external device, and the microcomputer writes data, which is received from the external device and rewrites the internal nonvolatile memory, in the internal nonvolatile memory and the external nonvolatile memory.

Advantageous Effects of Invention

According to the representative embodiment of the present invention, the rewrite of the internal nonvolatile memory and the backup to the external nonvolatile memory can be executed at high speed. Problems, configurations, and effects other than those described above will be clarified by the following description of embodiments.

BRIEF DESCRIPTION OF DRAWINGS

FIG. 1 is a view illustrating a configuration of a system according to an embodiment of the present invention.

FIG. 2A is a view illustrating an example of arrangement of a control program according to a first embodiment.

FIG. 8 is a flowchart illustrating control processing executed by a processor of the second embodiment on the external nonvolatile memory.

FIG. 10 is a view illustrating correspondence between processing and a task according to a third embodiment.

FIG. 11A is a view illustrating an example of arrangement of a control program according to the third embodiment.

FIG. 11B 7 is a view illustrating an example of the arrangement of the control program according to the third embodiment.

FIG. 12 is a flowchart illustrating control of task execution according to the third embodiment.

DESCRIPTION OF EMBODIMENTS

Figure 2B:
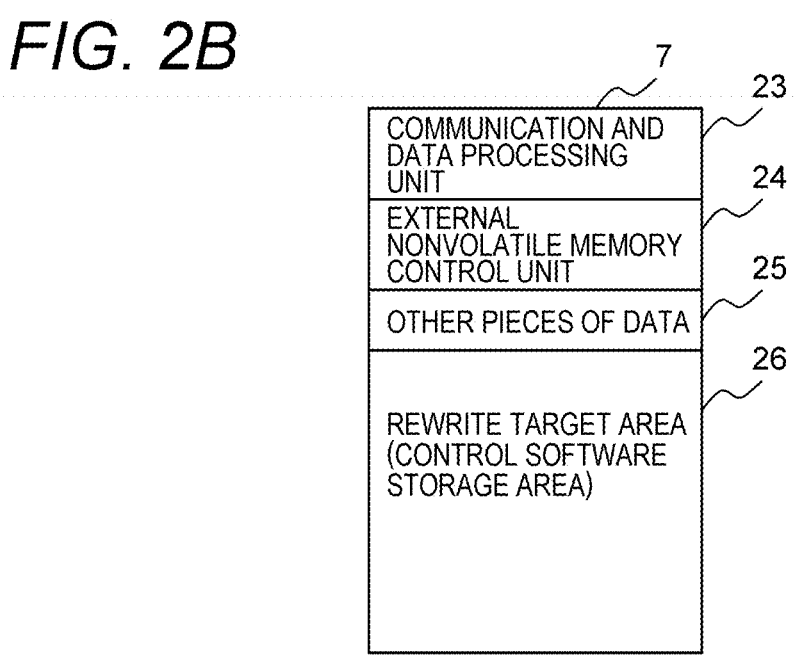
FIG. 2B is a view illustrating an example of the arrangement of the control program according to the first embodiment.

Hereinafter, embodiments of the present invention will be described with reference to the accompanying drawings.

FIG. 1 is a view illustrating a configuration of a system according to an embodiment of the present invention.

The system of the present embodiment includes an ECU 1 and an external device 10 connected through a communication line 11.

The external device 10 is mounted on a device having a microcomputer as a main part, for example, a personal computer, has a function of communicating with the ECU 1, and has software that implements functions necessary for operation of the embodiment. The external device 10 is connected to the ECU 1 through an interface such as an external connector provided in the ECU 1 or a connector of a vehicle connected to the external connector.

A microcomputer 2 is mounted on the ECU 1. The microcomputer 2 includes at least one processor 3a that executes software (in a case where a plurality of processors are mounted, the processor 3a and the processor 3b . . . are used), at least one volatile RAM 5, at least one communication unit 6 that communicates with the external device, an internal nonvolatile memory 7 that holds a program, at least one communication unit 8 that communicates with an external nonvolatile memory 9, and a bus 4 that connects the respective elements. The microcomputer 2 is connected to the external nonvolatile memory 9 through the communication unit 8. As will be described later, the external nonvolatile memory 9 stores backup data of the control program executed in the internal nonvolatile memory 7, and the backup data is used for rolling back when the update of the control program fails. The ECU 1 can communicate with the external device 10 connected to the ECU 1 through at least one communication unit 6.

First Embodiment

In a first embodiment, a method for achieving a high speed using a command from the external device 10 for a purpose different from an original purpose will be described.

In the first embodiment, in the case where a processor other than the processor 3a exists, it is assumed that the processing of the processors is stopped or appropriate processing such as operation (see FIG. 2) is performed on the RAM so as not to disturb a series of processing.

FIGS. 2A and 2B are views illustrating an example of a configuration of a control program of the first embodiment, FIG. 2A illustrates arrangement in the RAM 5, and FIG. 2B illustrates arrangement in the internal nonvolatile memory 7.

Main programs executed by the processor 3a include a communication and data processing unit 23 that executes communication control with the external device 10 and decompression processing and decoding processing of received write data, an internal nonvolatile memory rewrite unit 21 that executes processing on data stored in the internal nonvolatile memory 7, and an external nonvolatile memory control unit 24 that executes processing on the external nonvolatile memory 9.

The internal nonvolatile memory rewrite unit 21 is disposed in the RAM 5. In addition to the internal nonvolatile memory rewrite unit 21, the RAM 5 stores a program 22 referred to by another processor not involved in the operation of the processor 3a.

The reason why the program is arranged in this manner is that, when the internal nonvolatile memory 7 is rewritten, it is necessary to shift the internal nonvolatile memory 7 from ta normal state to a rewritable state, but the program stored in the internal nonvolatile memory 7 cannot be executed in the rewritable state. For that reason, after control of the processor 3a is transferred to the internal nonvolatile memory rewrite unit 21 on the RAM 5 immediately before rewriting, the data in the internal nonvolatile memory 7 is rewritten after shifting to the rewritable state, and the rewriting is completed and the state is returned to the normal state, and then the control of the processor 3a is returned to the communication and data processing unit 23 on the internal nonvolatile memory 7.

Other processors cannot execute the program stored in the internal nonvolatile memory 7 when the internal nonvolatile memory 7 is in the rewritable state. That is, when the internal nonvolatile memory 7 is in the rewritable state, programs of other processors also need to be executed on the RAM 5. Considering that each processor moves independently, this condition is satisfied by the above-described arrangement.

In the RAM 5, due to its characteristic, the written data is not retained and disappears when the power supply is shut off. Therefore, the program arranged in the RAM 5 is stored as a part of other data 25 of the internal nonvolatile memory 7, and the program is copied from the other data 25 to the RAM 5 before the series of rewrite processing of the internal nonvolatile memory 7 is executed. Thereafter, the processor other than the processor 3a reads the program from a predetermined address on the RAM 5 and executes the processing.

Figure 3:
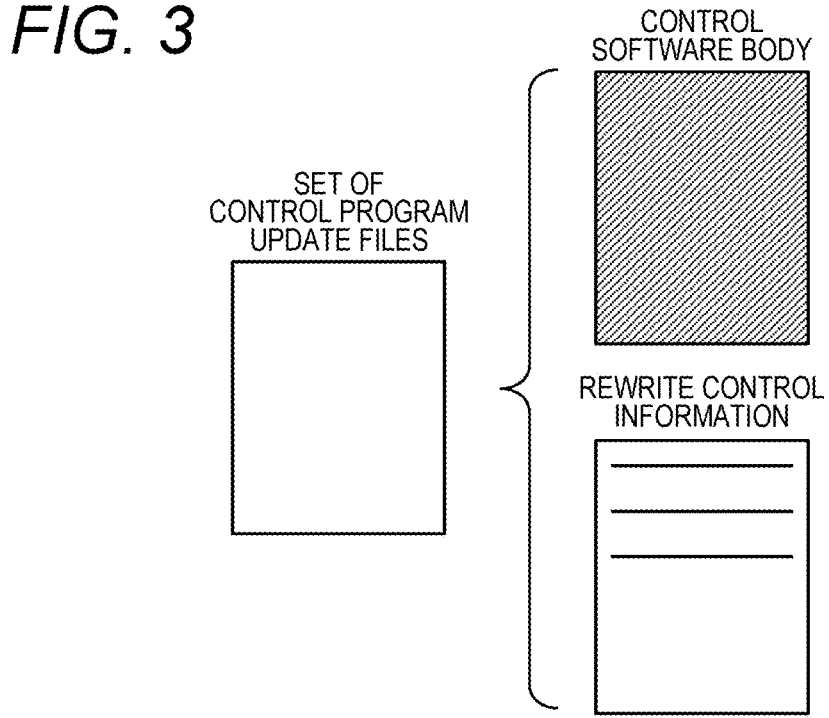
FIG. 3 is a view illustrating an example of a file used for updating the control program of the first embodiment.

FIG. 3 is a view illustrating an example of a file used for updating the control program of the first embodiment.

The file used for updating the control program is roughly divided into a control software body for update and rewrite control information. The rewrite control information is an address to be written, a program size to be written, a format of data to be written, a value for verifying whether data is correctly written after rewriting, and the like. The file is given to the external device 10 by designating the file to the external device 10. Thereafter, rewriting of the program can be appropriately controlled by sending these pieces of information to the ECU 1 at appropriate timing.

Figure 4:
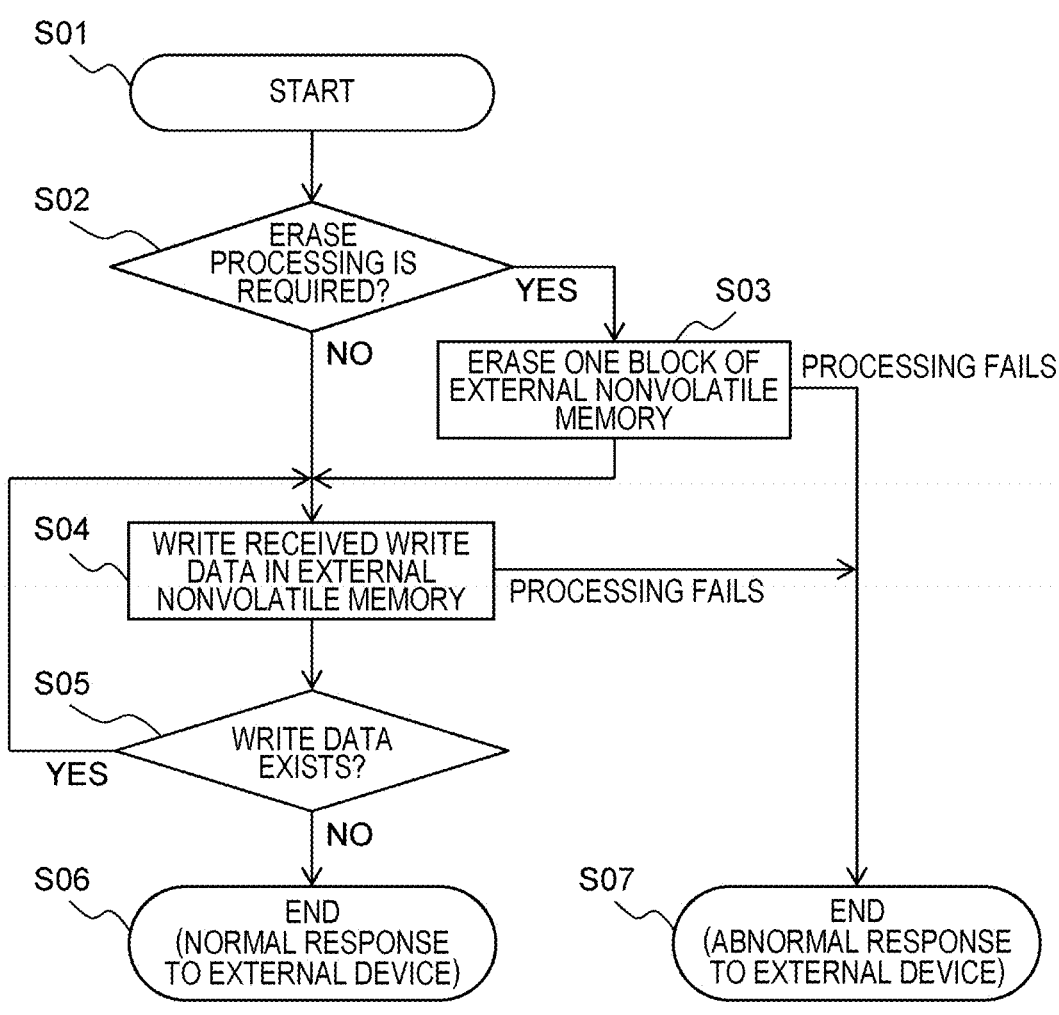
FIG. 4 is a flowchart illustrating processing executed by a processor of the first embodiment on an external nonvolatile memory.

FIG. 4 is a flowchart illustrating processing executed by the processor 3a on the external nonvolatile memory 9.

The processor 3a starts the processing in response to the reception of the write data from the external device 10 (S01).

Subsequently, the processor 3a determines necessity of erase processing of the external nonvolatile memory 9 from the current write target address and the size of the data received from the external device 10 (S02), and erases the data stored in the external nonvolatile memory 9 in a predetermined erase unit (S03) when it is determined that the erase processing is necessary.

Thereafter, the processor 3a writes the received write data in the external nonvolatile memory 9 in a certain unit (S04). Thereafter, the processor 3a determines whether the write data (S05) still exists, and repeats the processing of step S04 until the write processing of all the write data is completed. Then, when the write processing of all the write data is completed, the processing is normally ended, so that a normal response is returned to the external device and the next write data is requested (S06).

When the erase processing (S03) or the write processing (S04) is not normally ended, the processing is ended, and an abnormal response is returned to the external device (S07). The external device informs a user of an appropriate error message.

Subsequently, a procedure of rewriting the internal nonvolatile memory 7 and writing the backup data in the external nonvolatile memory 9 by the system of the first embodiment will be described with reference to FIG. 5.

First, as illustrated in an example in FIG. 3, updated control software written in the ECU 1 and a file including control information related to the software are prepared, and the file is designated by the external device 10. Thereafter, the processing is started in response to an instruction of a start operation from the user (S11). The external device 10 reads and stores the designated file (S12).

Thereafter, the external device 10 transmits an initialization command for writing to the ECU 1 (S13). Information such as a rewrite target, a size, and a data type of the file read in step S12 is transmitted to the ECU 1 by the initialization command. The ECU 1 performs required preparation for rewrite control based on this information.

Thereafter, the external device 10 transmits the write data of the update software a plurality of times (S14 to S16). The processor 3a executes the processing in FIG. 4 and executes the write processing of the external nonvolatile memory 9 by appropriately controlling the communication unit 8. When the series of processing in FIG. 4 is normally ended (S06), the ECU 1 requests the external device 10 for next write data. When the processing is abnormally ended (S07), the external device 10 notifies the user of a response indicating that the processing is abnormally ended, and ends the processing halfway. The above processing is repeated until all the write data is written.

When the last write data is received (S16), the processing of the received last write data is completed, and the normal response is transmitted to the external device 10, an end notification is received from the external device 10 (S17). Originally, the end notification of step S17 is transmitted to the ECU 1 to notify the end of the rewrite processing, but in the first embodiment, the rewrite processing of reading the data written in the external nonvolatile memory 9 and writing the data in the internal nonvolatile memory 7 is executed at the timing when the ECU 1 receives the end notification. Specifically, a predetermined amount of data written in the external nonvolatile memory 9 is read from the head, the appropriate processing such as the decoding processing and the decompression processing is executed, and the processing of rewriting the internal nonvolatile memory 7 is repeated.

Immediately before the internal nonvolatile memory 7 is rewritten, the control by the processor 3*a* is transferred from the communication and data processing unit 23 to the internal nonvolatile memory rewrite unit 21, and the internal nonvolatile memory 7 is rewritten after the state of the internal nonvolatile memory 7 is shifted to the rewritable state. After the completion of the rewriting, the internal nonvolatile memory 7 is returned to the normal state, and then control by the processor 3*a* is returned to the communication and data processing unit 23.

When the above processing is executed to normally complete the rewriting of the internal nonvolatile memory 7, the normal response is returned to the external device 10 in response to the end notification (S17). Upon receiving this normal response, the external device 10 notifies the user that the series of processing is normally completed (S18). On the other hand, when the rewriting of the internal nonvolatile memory 7 fails in the middle, the external device 10 is notified of the abnormal end in response to the end notification (S17), and the user is notified of the abnormal end.

The effect of speeding up by the method of the first embodiment is as follows. At first glance, because the data is written in two nonvolatile memories (external nonvolatile memory 9, internal nonvolatile memory 7) in order, the processing time seems to be the same as that in the case of writing the data in each of the two nonvolatile memories (in the case of performing the writing twice). However, the update data may be transferred once from the external device 10. In particular, when the first embodiment is applied to the currently mainstream CAN, most of the processing time is the transfer time of the update data to the ECU 1. The speed of reading the write data from the external nonvolatile memory 9 is faster than the data transfer time to the ECU 1 through the CAN, the rewriting of the internal nonvolatile memory 7 can be speeded up by the difference.

Although the example of rewriting the nonvolatile memory has been described above with reference to FIG. 5, other processing may be executed before and after the rewriting within a range not affecting the original operation of the program. As an example based on actual operation, a command for reading specific information on the ECU 1 before rewriting or a value for verifying whether intended software is updated after rewriting before initialization (S13) may be transmitted, and after completion of processing by the end notification (S17), the ECU 1 may perform arithmetic operation using data in the memory after writing by a predetermined method based on a command from the external device 10 and collate the calculated value with a previously-transmitted value.

In addition, because the writing in the internal nonvolatile memory 7 is controlled by each processor using the data written in the internal nonvolatile memory 7, it is necessary to write raw data before conversion, but the data written in the external nonvolatile memory 9 is for the backup purpose. Focusing on this point, in FIG. 5, the data written in the external nonvolatile memory 9 is the received write data itself, but the data converted by some method may be written in the external nonvolatile memory 9. Specifically, the compressed or encrypted write data may be decrypted and written, written after decompressed, or written after decrypted and decompressed (the same data as that of the internal nonvolatile memory 7). That is, the data written in the external nonvolatile memory 9 may be the same as the data before conversion by performing some conversion by processing of the processor. As described above, practically, it is essential that the data written in the external nonvolatile memory 9 is encrypted.

Figure 5:
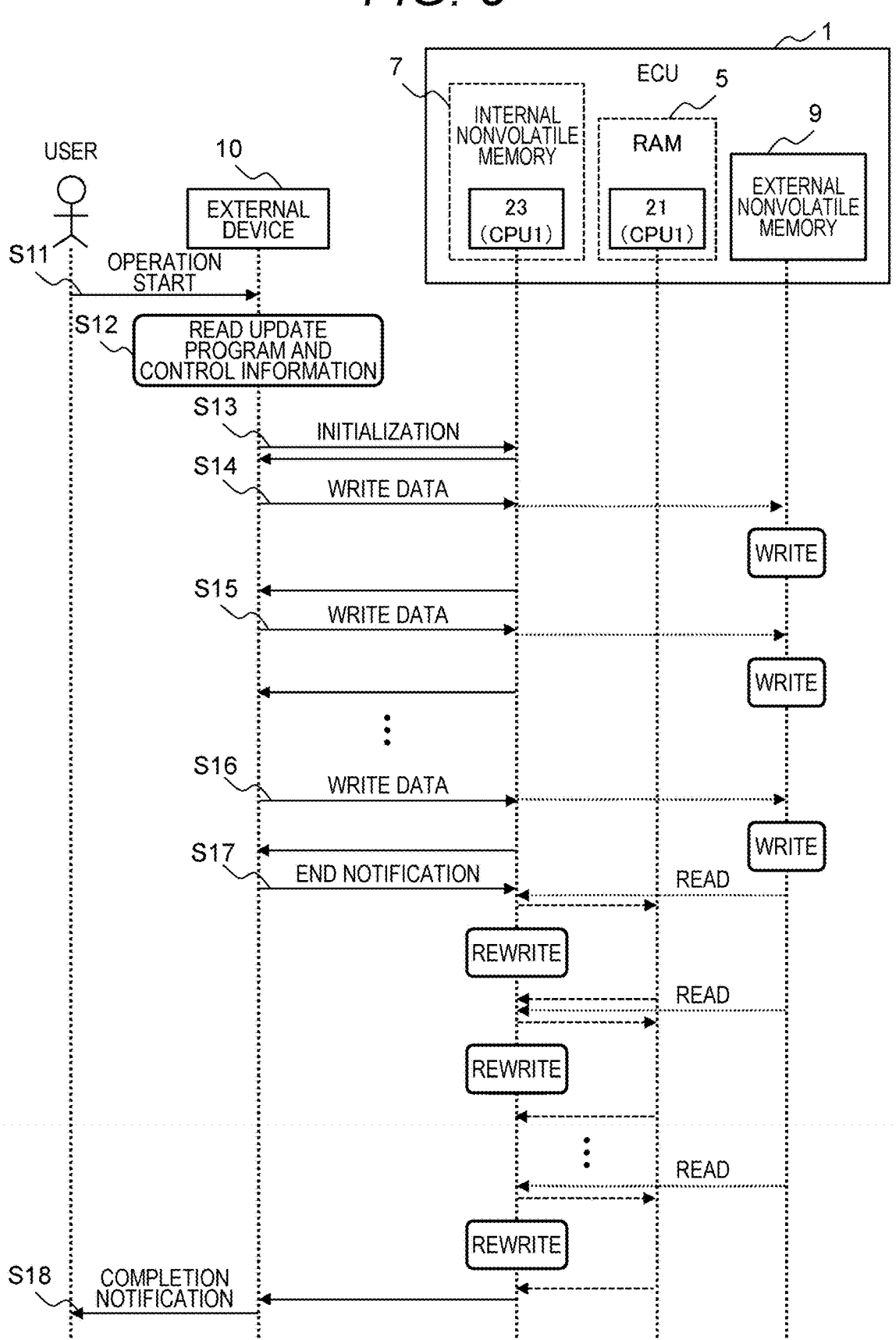
FIG. 5 is a view illustrating a procedure of rewriting an internal nonvolatile memory and writing backup data to the external nonvolatile memory according to the first embodiment.

In FIG. 5, the procedure of writing the data in the external nonvolatile memory 9 and then rewriting the internal nonvolatile memory 7 is adopted. However, the reverse procedure, that is, the data may be written in the external nonvolatile memory 9 after rewriting the internal nonvolatile memory 7.

In general, the write data transferred from the external device 10 is encrypted or compressed. When the internal nonvolatile memory 7 is rewritten, the transferred data is written after returned to the original data by the decoding and decompression. That is, in the case of writing in the external nonvolatile memory 9, the decompressed data is written, so that an amount of written data increases. Alternatively, the encryption or compression is performed, which requires two steps. Considering this point, processing efficiency decreases in the order of writing the data in the external nonvolatile memory 9 after rewriting the internal nonvolatile memory 7.

Second Embodiment

An example of the procedure of achieving a high speed by performing the write processing in parallel using two processors 3*a*, 3*b* will be described in a second embodiment. Hereinafter, a description will be given with reference to the accompanying drawings.

For the configuration of the system of the second embodiment, at least two processors (CPU) 3*a*, 3*b* that execute software are required. Other points are the same as those in FIG. 1.

Each of the processor 3*a* and the processor 3*b* executes processing on the internal nonvolatile memory 7 and the external nonvolatile memory 9. The processor other than this may stop the processing so as not to disturb the series of processing or execute a program stored in a memory (for example, the RAM 5) different from the internal nonvolatile memory 7 (see FIG. 6A).

Figure 6A:
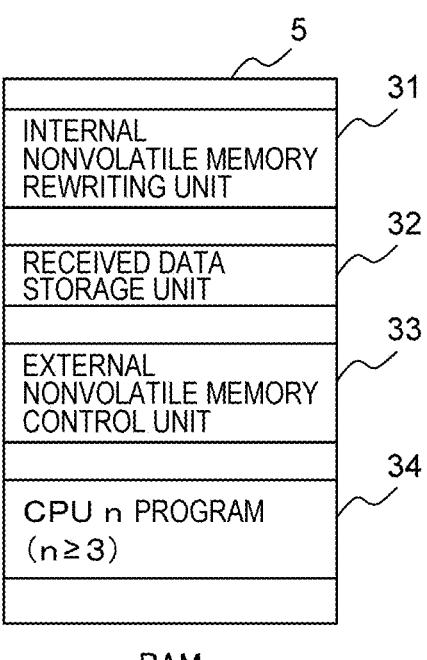
FIG. 6A is a view illustrating an example of arrangement of a control program according to a second embodiment.
Figure 6B:
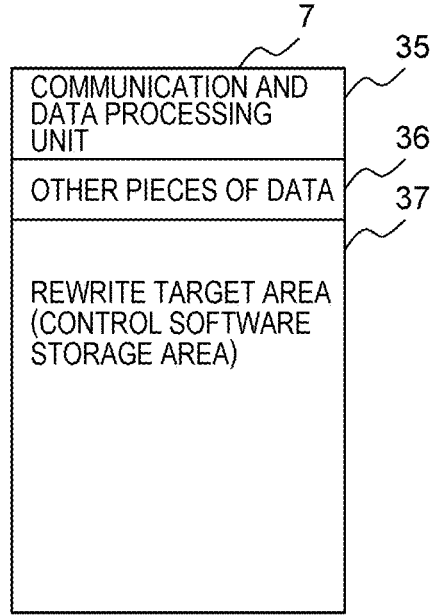
FIG. 6B is a view illustrating an example of the arrangement of the control program according to the second embodiment.

FIGS. 6A and 6B are views illustrating an example of a configuration of a control program of the second embodiment, FIG. 6A illustrates arrangement in the RAM 5, and FIG. 6B illustrates arrangement in the internal nonvolatile memory 7.

Main programs executed by the processor 3*a* are an internal nonvolatile memory rewrite unit 31 and a communication and data processing unit 35. The internal nonvolatile memory rewrite unit 31 and the communication and data processing unit 35 are the same as the internal nonvolatile memory rewrite unit 21 and the communication and data processing unit 23 of the first embodiment. The internal nonvolatile memory rewriter 31 is disposed in the RAM 5 for the same reason as in the first embodiment.

In addition to the internal nonvolatile memory rewrite unit 31, the RAM 5 stores a program 34 referred to by a processor not involved in the operations of the processors 3*a*, 3*b*. The reason why the program 34 is arranged in the RAM 5 is the same as that in the first embodiment.

The second embodiment is different from the first embodiment in the following two points. One is that a received data storage unit 32 that is a buffer for executing processing, in which the processor 3*a* stores the write data received from the external device 10 and the processor 3*b* reads the stored data and writes the data in the external nonvolatile memory 9, is provided. The other is that an external nonvolatile memory control unit 33, which is a main program executed by the processor 3*b*, is stored in the RAM 5. The reason why the external nonvolatile memory control unit 33 is stored in the RAM 5 is that, similarly to the first embodiment, the program stored in the internal nonvolatile memory 7 cannot be executed in the rewritable state of the internal nonvolatile memory 7. In the second embodiment, the external nonvolatile memory control unit 33 is arranged in the RAM 5 in order to freely control the external nonvolatile memory 9 during the execution of the processing on the internal nonvolatile memory 7.

In the RAM 5, due to its characteristic, the written data is not retained and disappears when the power supply is shut off. For this reason, the program arranged in the RAM 5 is stored as a part of other data 36 of the internal nonvolatile memory 7, and the program is copied from the other data 36 to the RAM 5 before the series of rewrite processing of the internal nonvolatile memory 7 is executed. Thereafter, the processor other than the processor 3*a* reads the program from a predetermined address on the RAM 5 and executes the processing.

Figure 7:
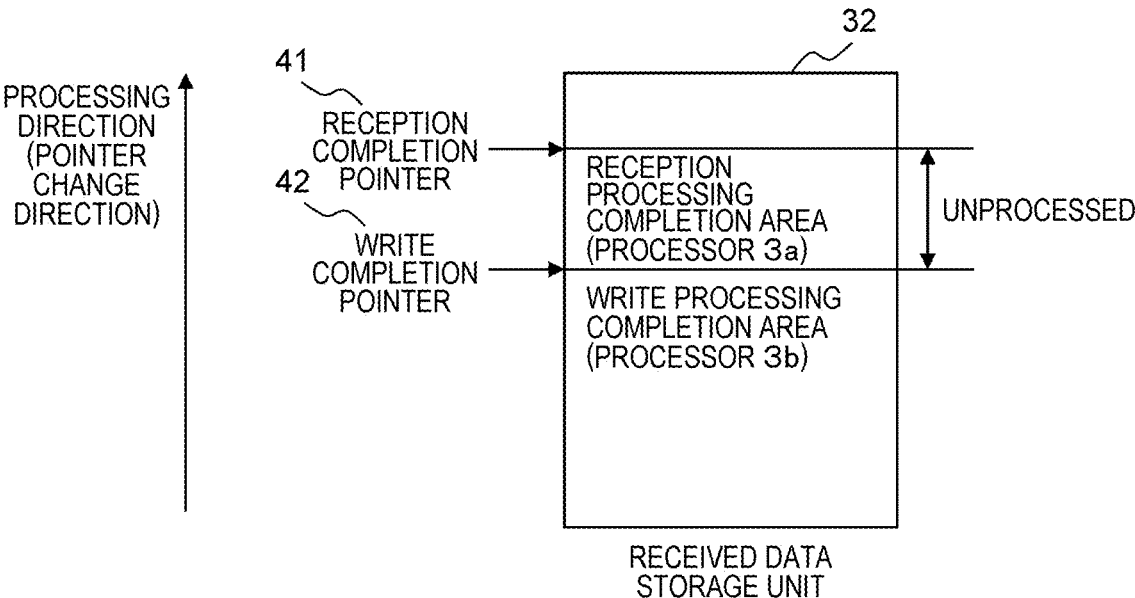
FIG. 7 is a view illustrating a configuration of a received data storage unit according to the second embodiment.

FIG. 7 is a view illustrating a configuration of the received data storage unit 32.

Two pointers, namely, a reception completion pointer 41 indicating an end at which the write data received from the external device 10 is written and a write completion pointer 42 indicating an end of data at which the write processing with respect to the external nonvolatile memory 9 is completed, are provided in the received data storage unit 32. Between the reception completion pointer 41 and the write completion pointer 42, the write data received from the external device 10 is unprocessed data that is not written in the external nonvolatile memory 9. The values of these pointers increase or decrease in a certain direction (increase or decrease in a certain direction with respect to the address of the RAM 5), and there is an upper limit value determined by the size of the received data storage unit 32. In other words, the upper limit value indicates the end of the received data storage unit 32.

In an initial state, values (addresses indicated by both pointers) of both pointers 41, 42 are the same, but in the series of processing, operation is performed as follows. The processor 3*a* executes the processing of writing the write data received from the external device 10 in the received data storage unit 32 in a certain direction by the communication and data processing unit 35. After the write processing is finished, the value of the reception completion pointer 41 is changed by the amount of data written. Thereafter, after the completion of the processing on the internal nonvolatile memory 7 that the processor 3*a* is in charge of, the processor 3*a* transmits a result of the processing to the external device 10.

On the other hand, the processor 3*b* executes processing as follows. When there is a difference between the reception completion pointer 41 and the write completion pointer 42, there is unprocessed data that is not written in the external nonvolatile memory 9. For this reason, the processor 3*b* reads a predetermined amount of data from a location indicated by the write completion pointer 42, and writes the data in the external nonvolatile memory 9. Thereafter, the value of the write completion pointer 42 is changed in the same direction as the reception completion pointer 41 by the amount of data written. When the reception completion pointer 41 is matched with the write completion pointer 42, the processor 3*b* waits without performing the write processing because there is no unprocessed data. Thereafter, when the reception completion pointer 41 advances by the processor 3*a*, there is a difference between the reception completion pointer 41 and the write completion pointer 42, so that the processor 3*b* resumes the data writing in the external nonvolatile memory 9.

Each of the processors 3*a*, 3*b* independently executes the above-described processing, but in the case corresponding to the following two points, the processors 3*a*, 3*b* execute the processing in synchronization. One is waiting for the response to the external device 10 until the value of the reception completion pointer 41 reaches the upper limit value even when the processing of the processor 3*a* is completed in the case where the value of the write completion pointer 42 reaches the upper limit value. After the reception completion pointer 41 and the write completion pointer 42 reach the upper limit value, the processor 3*a* returns the reception completion pointer 41 and the write completion pointer 42 to the initial values after responding to the external device 10. Thereafter, the above-described processing is executed.

In the other case, when the write data received from the external device 10 is the last data, the processor 3*a* makes the response after waiting until the reception completion pointer 41 and the write completion pointer 42 are matched with each other. Whether the write data is the last write data can be determined based on, for example, size information about the program sent previously from the external device 10, the amount of data received from the external device 10 measured inside the ECU 1, and the size of the write data received this time.

FIG. 8 is a flowchart illustrating control processing executed by the processor 3*b* on the external nonvolatile memory.

When the processor 3*b* starts the processing according to the operation of the user, the processor 3*b* waits for a command from the processor 3*a* (S21). Thereafter, when receiving the first write data from the external device 10, the processor 3*b* proceeds to step S22 by the operation of the processor 3*a* and starts the processing.

In step S22, it is determined whether erase processing of the external nonvolatile memory 9 in the area where the write data is to be written is required. When the erase processing is required, the data is erased in an erase unit of the external nonvolatile memory 9 (S23).

Thereafter, it is determined whether there is writable data by the procedure described with reference to FIG. 7 (S24). When there is no unwritten data, the processing stands by in S24. When there is data to be written, the write data is read from the received data storage unit 32 and written in the external nonvolatile memory 9 (S25, S26). After the writing, the written data is verified (S27). For example, the data in the same range as the place where the data is written in step S26 is read from the external nonvolatile memory 9, and it is checked whether the read data is matched with the written data. In the case of coincidence, it is determined that the writing is correctly performed, and the write completion pointer 42 is advanced. Thereafter, it is determined whether the write completion pointer 42 reaches the upper limit value or the written data is the final data (S28). The processing returns to step S21 when the condition is satisfied, and the processing returns to step S24 when neither condition is satisfied.

In the case where the write completion pointer 42 reaches the upper limit value, and thus the processing proceeds to step S21, after the reception completion pointer 41 and the write completion pointer 42 are cleared by the processor 3*a*, the processing proceeds to step S22 by the operation from the processor 3*a*, and it is determined whether the erasing is necessary.

The above processing is repeated until there is no more data to be written.

Regarding step S22, the affirmation is always determined when the size of the received data storage unit 32 is matched with the erase unit of the external nonvolatile memory 9. For this reason, the size of the received data storage unit 32 may be set, and the processing may be simplified so as to execute step S23 without performing the determination of step S22.

A procedure of performing the rewriting of the internal nonvolatile memory 7 and writing in the external nonvolatile memory 9 in parallel according to the second embodiment will be described below with reference to FIG. 9.

Steps S31 to S33 are the same as steps S11 to S13 of the first embodiment.

In step S34, the first write data is transferred from the external device 10. After storing the received write data in the received data storage unit 32, the processor 3a advances the reception completion pointer 41. At the same time, the processor 3b is instructed to proceed to step S22, and the processing of the processor 3b is started. Thereafter, when the rewrite processing to the internal nonvolatile memory 7 can be performed, the processing is executed. Because the necessary data amount is not reached in S34, the processing is not executed. After the completion of the rewrite processing to the internal nonvolatile memory 7, the processing result is returned to the external device 10.

When the next write data is received from the external device 10 (S35), the next write data is similarly stored in the received data storage unit 32. Thereafter, the internal non-volatile memory 7 is rewritten. The processing transitions to the internal nonvolatile memory rewrite unit 31 once immediately before rewriting, and the data is rewritten after the internal nonvolatile memory 7 transitions to the rewritable state. After the completion of the rewriting, the internal nonvolatile memory 7 is returned to the normal state, and then, the control of the processor 3a is returned to the communication and processing unit 35, and thereafter, the processing result is returned to the external device 10.

On the other hand, in steps S34, S35, the processor 3b executes the processing in FIG. 8 regardless of the movement of the processor 3a. A difference is generated between the reception completion pointer 41 and the write completion pointer 42 in step S34, the data is appropriately controlled in the external nonvolatile memory 9 through the communication unit 8 and written. After the end of the data writing, the write completion pointer 42 is advanced by the amount of writing. In FIG. 9, before the processor 3a receives the write data in step S36, the reception completion pointer 41 and the write completion pointer 42 coincide with each other and enter a standby state. In step S36, the processor 3a receives new write data, and when the reception completion pointer 41 advances, the write processing is resumed.

Thereafter, the above-described processing is repeated until the reception completion pointer 41 reaches the upper limit value. Then, in the case where the reception completion pointer 41 reaches the upper limit value in step S37, the processor 3a waits for the response to the external device 10 until the write completion pointer 42 reaches the upper limit value as described with reference to FIG. 7. Then, after waiting for the write completion pointer 42 to reach the upper limit value (S38), the processor 3a returns the processing result to the external device 10. In the reception of the next write data (S39), the processor 3a sets the reception completion pointer 41 and the write completion pointer 42 to the initial values, and repeats the processing from S34.

Then, when the last write data is received (S40), the same processing as steps S37, S38 is executed regardless of the current pointer position (S41).

After all the write data are received to finish the processing of the ECU 1, the external device 10 transmits an end command (S42). In the case where a normality response is received from the ECU 1, the external device 10 notifies the user of the completion of the processing (S43), and ends the series of processing.

The above pieces of processing are sequentially performed. However, in the case where the processing fails for some reason in the middle, the external device 10 notifies the user of an abnormal end of the processing. Each of the processor 3a and the processor 3b independently executes the processing, but in the case where any error is generated in the process of the processing of the external nonvolatile memory 9, the processor 3b notifies the processor 3a of the generation of the error, and returns the error to the external device 10 to end the processing even when the processor 3a normally tends its own processing.

The effect of speeding up by the method of the second embodiment is as follows. A side of the internal nonvolatile memory 7 that the processor 3a is in charge of is different in terms of the writing in the received data storage unit 32, the synchronization with a side of the external nonvolatile memory 9, and the like, but can perform processing in substantially the same manner as the conventional wired method. When the processor 3b can perform backup processing to the external nonvolatile memory 9 using a processing time, the processing can be performed in substantially the same time as the rewriting of the internal nonvolatile memory 7. When rewriting performance of the external nonvolatile memory 9 is significantly worse than that of the internal nonvolatile memory 7, this processing cannot be achieved. However, even in this case, the speed can be increased by the reduction in the data transfer time because data transfer is unnecessary (processed on the side of the internal nonvolatile memory 7) as compared with the write processing from the external device 10 to the external nonvolatile memory 9. In summary, the processing time can be sped up to the same level the fastest time, and can be sped up to the latest time than the processing time for writing in the external nonvolatile memory 9 alone.

Although the example of rewriting the nonvolatile memory has been described above with reference to FIG. 9, other pieces of processing described in the first embodiment may be executed before and after the rewriting as long as the rewriting does not affect the original operation of the program.

Third Embodiment

An example of a procedure of simultaneously executing processing on two nonvolatile memories by multitask processing using one processor will be described in a third embodiment. Hereinafter, a description will be given with reference to the accompanying drawings.

A configuration of a system according to the third embodiment is similar to that of the first embodiment. Similarly to the first embodiment, in the case where there is a processor other than the processor 3a, the pieces of processing of the processors are stopped or the operation (see FIG. 11) or the like is appropriately performed on the RAM 5 so as not to disturb the series of processing.

In the procedure of the series of rewriting, contents processed by the processor are finely divided as illustrated in FIG. 10, and classified into three tasks of a communication and data processing task 55, an internal nonvolatile memory rewriting task 51, and an external nonvolatile memory control task 53.

The communication and data processing task 55 includes transmission and reception processing with the external device 10, reception processing according to a predetermined protocol, storage processing in the received data storage unit 52, decoding processing of the write data, and decompression processing of the write data, and executes any processing according to the current internal state. The internal nonvolatile memory rewriting task 51 includes the erasing of the internal nonvolatile memory 7, the writing of the internal nonvolatile memory 7, and end checking processing of the erasing and writing, and executes any processing according to the current internal state. The external nonvolatile memory control task 53 includes the erasing of the external nonvolatile memory 9, the writing of the external nonvolatile memory 9, the reading of the external nonvolatile memory 9, and the end checking processing of the erasing and writing processing, and executes any processing according to the current internal state.

In general, it takes time to erase and write the nonvolatile memory from the transmission of a command to the completion of the command. Meanwhile, when the processor is brought into the standby state in which the processor does not execute other processing, the overall processing efficiency decreases. For this reason, the processing efficiency can be improved by separating the command processing for the erasing and writing processing and the processing for checking whether the processing is completed.

FIGS. 11A and 11B are views illustrating an example of a configuration of a control program of the third embodiment, FIG. 11A illustrates arrangement in the RAM 5, and FIG. 11B illustrates arrangement in the internal nonvolatile memory 7.

The processing program included in the communication and data processing task 55 is arranged in the internal nonvolatile memory 7, and the processing program included in the internal nonvolatile memory rewriting task 51 and the processing program included in the external nonvolatile memory control task 53 are arranged in the RAM 5.

At this point, the internal nonvolatile memory rewriting task 51, the external nonvolatile memory control task 53, and the communication and data processing task 55 of the third embodiment are the same as the internal nonvolatile memory rewrite unit 31, the external nonvolatile memory control unit 33, and the communication and data processing unit 35 of the first embodiment. Other data 56, the received data storage unit 52, and the like are also the same as those in the first embodiment.

The tasks are divided as described above, and the processing is repeated by one processor according to the sequence in FIG. 12, and the processing is executed at high speed while the standby time of the processor is minimized. As illustrated in FIG. 12, a communication and data processing task 55 is normally executed (S52), and then an external nonvolatile memory control task 53 (S54) is executed. However, when the internal nonvolatile memory 7 is rewritten, the internal nonvolatile memory rewriting task 51 (S53) is executed instead of the communication and data processing task 55.

Switching between the communication and data processing task 55 and the internal nonvolatile memory rewriting task 51 can be performed by, for example, the following method. When the processing such as the decoding and the decompression of the received write data is completed to rewrite the internal nonvolatile memory 7 next time by the communication and data processing task 55, a flag indicating that the internal nonvolatile memory rewriting task 51 is executed instead of the communication and data processing task 55 is set at the end of the external nonvolatile memory control task 53. Then, after the completion of the external nonvolatile memory control task 53, the internal nonvolatile memory rewriting task 51 is activated. Thereafter, this state continues during the rewrite of the internal nonvolatile memory 7, and the internal nonvolatile memory rewriting task 51 initializes the flag after the completion of the rewrite of the internal nonvolatile memory 7, so that the state returns to the state in which the communication/data processing task 55 is executed after the next external nonvolatile memory control task 53 is executed.

Because the third embodiment is designed as described above, the same design as the second embodiment can be made. For example, the structure of the received data storage unit 52 can be the same as that in FIG. 7 of the second embodiment. A processing procedure using the reception completion pointer 41 and the write completion pointer 42 may be the same as that in the second embodiment (FIG. 7). In addition, the processing procedure to the external nonvolatile memory 9 may be the same as that in the second embodiment (FIG. 8). Specifically, as described above, from the viewpoint of processing efficiency, the command processing of the erase and write and the completion checking processing are provided separately, and thus, S23 and S26 are divided into two stages of "erase and write command" and "checking".

However, the third embodiment is different from the second embodiment in the following points. As can be seen from FIG. 12, the processing of each task is alternately executed. In the second embodiment, the rewrite processing of the internal nonvolatile memory 7 and the rewrite processing of the external nonvolatile memory 9 are independently and simultaneously executed in parallel, so that the processing can be executed with no waiting time without depending on a situation of each other. However, in the case of the third embodiment, the processing of another task ends, and the next processing does not proceed unless the user waits for the task. From such a viewpoint, the speed increase of the processing according to the third embodiment is slightly limited as compared with the second embodiment. However, because the processing to the external nonvolatile memory 9 can be executed during the communication control with the external device 10 and the processing of the internal nonvolatile memory 7, the processing can be speeded up similarly to the second embodiment. Furthermore, when the processing performance of the processor is high, the difference between the second embodiment and the third embodiment becomes small.

Specific processing of the third embodiment will be described with reference to FIG. 13. Because the overall control flow is the same as that in FIG. 9, the description will be given focusing on the internal operations in steps S64 and S65 (corresponding to S34 and S35 in FIG. 13).

Figure 9:
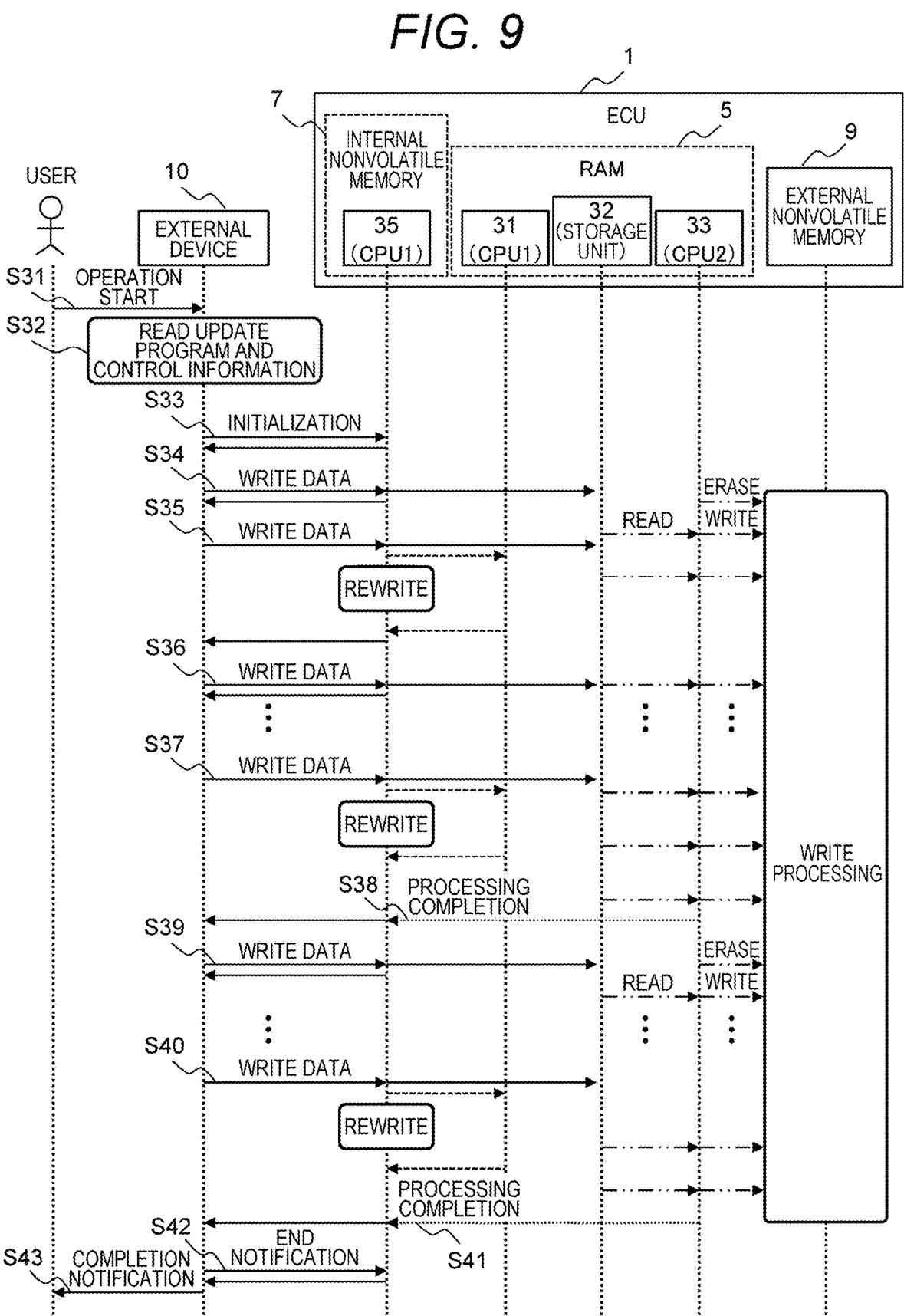
FIG. 9 is a view illustrating a procedure of rewriting the internal nonvolatile memory and writing the backup data to the external nonvolatile memory according to the second embodiment.
Figure 13:
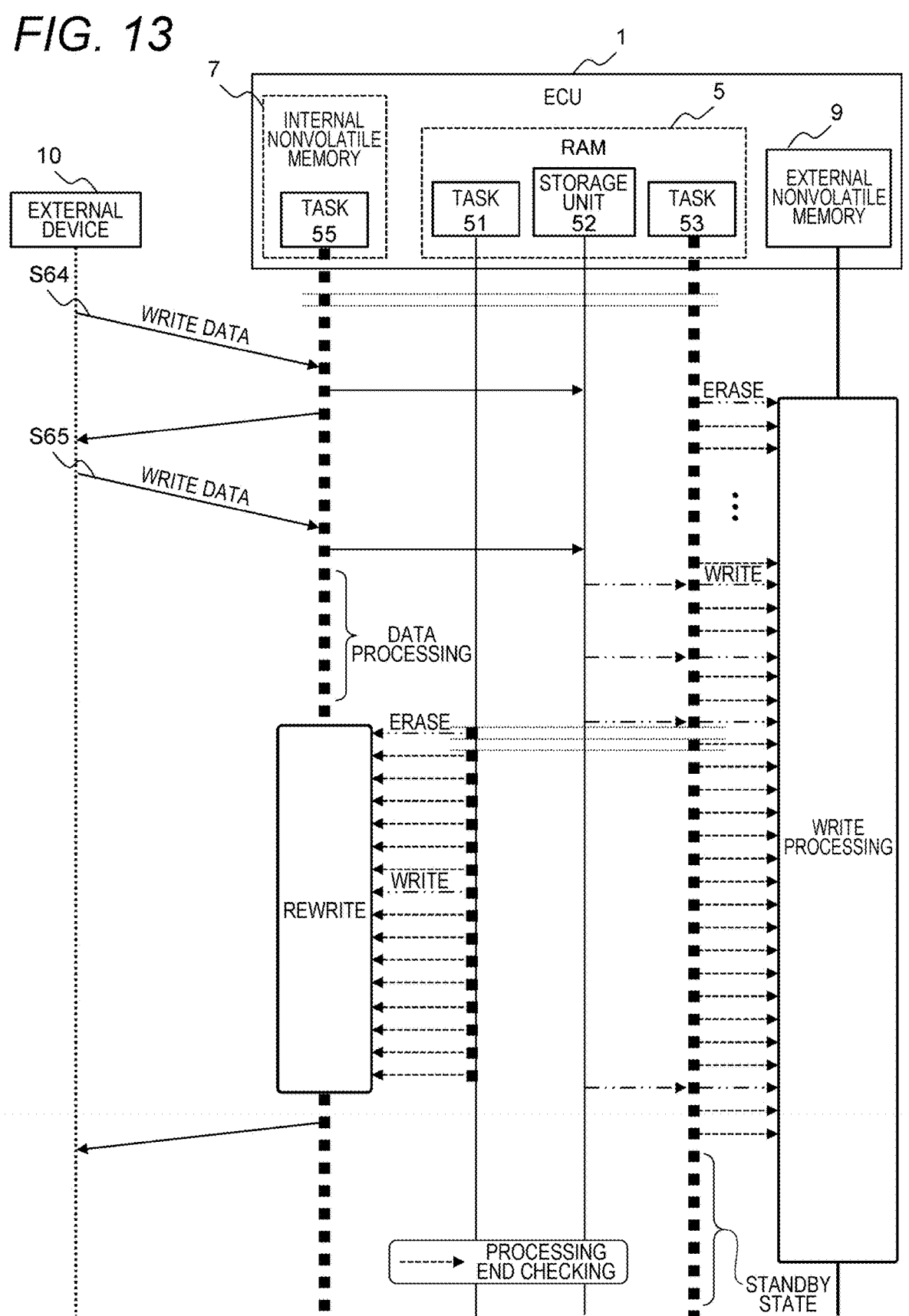
FIG. 13 is a view illustrating a procedure of rewriting the internal nonvolatile memory and writing the backup data to the external nonvolatile memory according to the third embodiment.

FIG. 13 is different from FIG. 9 in that a time axis is taken into consideration. As described above, the processor 3a alternately executes either the communication and data processing task 55 or the internal nonvolatile memory rewriting task 51 and the external nonvolatile memory control task 53 as illustrated in FIG. 12. FIG. 13 illustrates that the rewrite processing of the internal nonvolatile memory 7 by the internal nonvolatile memory rewriting task 51 and the write processing of the external nonvolatile memory 9 by the external nonvolatile memory control task 53 are alternately performed. An interval between the arrows indicating each processing is not related to the actual length of the processing time.

In S64, after received from the external device 10, the write data is stored in the received data storage unit 52 by the communication and data processing task 55. In the next external nonvolatile memory control task 53, the write data is stored in the received data storage unit 52, so that the processing for the external nonvolatile memory 9 is started. Specifically, the external nonvolatile memory control task 53 executes the processing of step S22 (determination of the necessity of the erase), and issues the processing of step S23 (erase command) to the external nonvolatile memory 9 through the communication unit 8 if necessary.

After the completion of the external nonvolatile memory control task 53, the processing of the processor proceeds to the communication and data processing task 55. In step S64, the processing for the internal nonvolatile memory 7 is not executed, but the response processing to the external device 10 is executed. Then, in the next external nonvolatile memory control task 53, a command checking whether the erase processing is completed is issued to the external nonvolatile memory 9, and whether the erase processing is completed is checked in response to the command. Thereafter, in the external nonvolatile memory control task 53, this processing is repeated until the completion of the erase processing can be checked. Thereafter, the processing in FIG. 8 is executed when the external nonvolatile memory control task 53 is executed.

After the response processing to the external device 10 is executed, the next write data S65 is received from the external device 10 in the communication and data processing task 55. After the reception, the processing is the same as that in step S64 until the data is written in the received data storage unit 52. Thereafter, the write data processing such as the decoding and the decompression is executed by several communication and data processing tasks 55. After the processing of the write data is completed, in order to write the write data in the internal nonvolatile memory 7, a flag is set to execute the internal nonvolatile memory rewriting task 51 next time instead of the communication and data processing task 55. After the completion of the external nonvolatile memory control task 53, the internal nonvolatile memory rewriting task 51 is executed, and thereafter, the pieces of processing of erase, checking, write, and checking are executed similarly to the external nonvolatile memory 9. The rewrite is completed and the next external nonvolatile memory control task 53 is completed, and then the flag is initialized to execute the communication and data processing task 55.

Thereafter, the processing is executed in the same flow as in the second embodiment. In the case where any error is generated in any task, an error notification is transmitted to the external device 10, and the processing is interrupted.

In addition, the other pieces of processing described in the first embodiment may be executed before and after the execution within a range not affecting the original operation of the program.

Modification

In each of the embodiments described above, from a practical point of view, the communication line 11 is configured in a wired manner, and the rewrite data is transferred through wired communication. However, the communication line 11 may be configured in a wireless manner, or the rewrite data may be transferred through wireless communication.

As described above, the electronic control device according to the embodiment of the present invention includes the microcomputer 2 including a processor that executes a predetermined program, and the external nonvolatile memory 9 connected to the microcomputer 2. The microcomputer 2 includes the internal nonvolatile memory 7, the communication unit 8 that communicates with the external nonvolatile memory 9, and the communication unit 6 that communicates with the external device 10. The microcomputer 2 writes data received from the external device 10 in the internal nonvolatile memory 7 and the external nonvolatile memory 9 in order to rewrite the internal nonvolatile memory 7. For this reason, in a configuration in which the microcomputer can access the internal nonvolatile memory 7 and the external nonvolatile memory 9, when the control software of the ECU 1 stored in the internal nonvolatile memory 7 of the microcomputer 2 is rewritten based on control from the external device 10, the rewrite of the internal nonvolatile memory 7 and the write of the backup data in the external nonvolatile memory 9 can be executed at high speed. In particular, the data is written to both the internal nonvolatile memory 7 and the external nonvolatile memory 9 in one-time data transfer from the external device 10, so that the processing can be speeded up.

The microcomputer 2 includes the received data storage unit 32 that stores the data received from the external device 10, and writes the same data as the data stored in the received data storage unit 32 in the internal nonvolatile memory 7 and the external nonvolatile memory 9, so that the internal processing is simple and the program can be speeded up.

In addition, the first processor 3a that performs the write processing on the internal nonvolatile memory and the second processor 3b that performs the write processing on the external nonvolatile memory are included, the first processor 3a writes the data received from the external device 10 in the received data storage unit 32 and the internal nonvolatile memory 7, and the second processor 3b writes the data stored in the received data storage unit 32 in the external nonvolatile memory 9, so that the processing can be distributed in the processors and the processing speed can be improved.

When the data received by the interface is encrypted, the microcomputer 2 decrypts the data received from the external device 10 and writes the data in the internal nonvolatile memory 7, and writes the data received from the external device 10 in the external nonvolatile memory 9 without decryption, so that the data for the rollback can be stored in the external nonvolatile memory 9 while maintaining security.

The present invention is not limited to the above-described embodiments, but includes various modifications and equivalent configurations within the spirit of the appended claims. For example, the above-described embodiments have been described in detail for easy understanding of the present invention, but are not necessarily limited to those having all the described configurations. Furthermore, a part of the configuration of one embodiment may be replaced with the configuration of another embodiment. In addition, the configuration of another embodiment may be added to the configuration of a certain embodiment. In addition, a part of the configuration of each embodiment may be added, deleted, or replaced with another configuration.

In addition, a part or all of the above-described configurations, functions, processing units, processing means, and the like may be implemented by hardware by, for example, designing with an integrated circuit, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an IC card, an SD card, and a DVD.

In addition, the control lines and the information lines indicate what is considered to be necessary for the description, abut do not necessarily indicate all the control lines and the information lines necessary for the mounting. In practice, it may be considered that almost all the configurations are connected to each other.

The invention claimed is:

1. An electronic control device comprising:
a microcomputer including a processor that executes a predetermined program; and
an external nonvolatile memory connected to the microcomputer,
wherein
the microcomputer includes a second processor, an internal nonvolatile memory, a first communication unit that communicates with the external nonvolatile memory, and a second communication unit that communicates with an external device, and
the microcomputer, in response to a single received instruction comprising data from the external device:
stores the data received as part of the single received instruction in a data buffer; and
writes the data in parallel from the data buffer to both the internal nonvolatile memory and the external nonvolatile memory using the processor and the second processor.

2. The electronic control device according to claim 1, wherein
the microcomputer includes a received data storage unit that stores the data received from the external device, and data identical to the data stored in the received data storage unit is written in the internal nonvolatile memory and the external nonvolatile memory.

3. The electronic control device according to claim 2, comprising:
a first processor that performs write processing on the internal nonvolatile memory; and
a second processor that performs write processing on the external nonvolatile memory,
wherein
the first processor writes the data received from the external device in the received data storage unit and the internal nonvolatile memory, and
the second processor writes the data stored in the received data storage unit in the external nonvolatile memory.

4. The electronic control device according to claim 1, wherein when the data received from the external device is compressed and encrypted, the microcomputer decompresses and decrypts the data received from the external device and writes the data in the internal nonvolatile memory, and
writing the data received from the external device in the external nonvolatile memory without decompressing and decoding the data.

5. A write control method executed by an electronic control device,
wherein the electronic control device includes a microcomputer including a processor that executes a predetermined program, and an external nonvolatile memory connected to the microcomputer,
the microcomputer includes a second processor, an internal nonvolatile memory, a first communication unit that communicates with the external nonvolatile memory, and a second communication unit that communicates with an external device, the microcomputer, in response to a single received instruction comprising data from the external device:
stores the data received as part of the single received instruction in a data buffer;
and writes the data received from the external device in parallel from the data buffer to both the internal nonvolatile memory and the external nonvolatile memory using the processor and the second processor.

* * * * *